(12) United States Patent
Kawaguchi et al.

(10) Patent No.: US 12,719,252 B2
(45) Date of Patent: Aug. 25, 2026

(54) ELECTRICAL JUNCTION BOX

(71) Applicant: Sumitomo Wiring Systems, Ltd., Yokkaichi (JP)

(72) Inventors: Kiyofumi Kawaguchi, Yokkaichi (JP); Takumi Ejima, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 181 days.

(21) Appl. No.: 18/699,776

(22) PCT Filed: Sep. 29, 2022

(86) PCT No.: PCT/JP2022/036334

§ 371 (c)(1),
(2) Date: Apr. 9, 2024

(87) PCT Pub. No.: WO2023/063089

PCT Pub. Date: Apr. 20, 2023

(65) Prior Publication Data

US 2024/0413625 A1 Dec. 12, 2024

(30) Foreign Application Priority Data

Oct. 12, 2021 (JP) ................................ 2021-167461

(51) Int. Cl.
*H02G 3/16* (2006.01)

(52) U.S. Cl.
CPC .................................... *H02G 3/16* (2013.01)

(58) Field of Classification Search
CPC ............. H02G 3/16; H01H 85/20; H05K 7/12
USPC ........................................................... 174/59
See application file for complete search history.

(56) References Cited

U.S. PATENT DOCUMENTS

2007/0010123 A1 1/2007 Ikeda
2016/0104983 A1 4/2016 Nakayama et al.

FOREIGN PATENT DOCUMENTS

JP H5-78129 U1 10/1993
JP 2005-158479 A 6/2005
JP 2017-200276 A 11/2017
JP 2018-126040 A 8/2018

OTHER PUBLICATIONS

International Search Report, Application No. PCT/JP2022/036334, mailed Nov. 8, 2022. ISA/Japan Patent Office.

*Primary Examiner* — Tremesha W Burns
(74) *Attorney, Agent, or Firm* — Brooks Kushman P.C.

(57) ABSTRACT

An electrical junction box provided with a component unit having an electronic component housed in a recess and connecting members connecting terminals of the electronic component to mounts outside of the recess includes a positioning portion provided on a long-side sidewall and a short-side sidewall of the recess to protrude further than edges of the long-side sidewall and the short-side sidewall, and configured to position the component unit by abutting against the connecting members, and spring portions provided in the recess and configured to press the component unit against the positioning portion.

7 Claims, 4 Drawing Sheets

ELECTRICAL JUNCTION BOX

CROSS-REFERENCE TO RELATED APPLICATIONS

This application is the U.S. national stage of PCT/JP2022/036334 filed on Sep. 29, 2022, which claims priority of Japanese Patent Application No. JP 2021-167461 filed on Oct. 12, 2021, the contents of which are incorporated herein.

TECHNICAL FIELD

The present disclosure relates to an electrical junction box.

BACKGROUND

Vehicles have an electrical junction box onboard that houses electronic components.

JP 2017-200276A discloses an electrical junction box in which, when fastening a fuse with a screw inserted through a through-hole provided in a terminal unit of the fuse, a bus bar is interposed between the terminal unit and the head of the screw, in order to prevent the rotating force that turns the screw from being transmitted directly to the terminal unit of the fuse that contacts the head of the screw and the terminal unit being deformed.

In order to improve work efficiency, a technique of positioning an electronic component by forming a recess having a shape that conforms to the electronic component and placing the electronic component in the aforementioned recess, is widely adopted, including in the electrical junction box of 2017-200276A.

Due to design errors or tolerances, however, a dimension of the recess may be larger than an expected value or a dimension of the electronic component may be smaller than an expected value. In this case, a gap is formed between the recess and the electronic component, generating noise due to play.

With the electrical junction box of 2017-200276A, however, no measures are taken to address the problem of play caused by the gap between the electronic component and the recess for housing the electronic component, and thus such problems cannot be solved.

Therefore, an object is to provide an electrical junction box that can prevent play caused by a gap between an electronic component and a recess for housing the electronic component.

SUMMARY

An electrical junction box according to an embodiment of the present disclosure is an electrical junction box provided with a component unit having an electronic component housed in a recess and a connecting member connecting a terminal of the electronic component to a contact outside of the recess, the electrical junction box including a positioning portion provided on a sidewall of the recess to protrude further than an edge of the sidewall, and configured to position the component unit by abutting against the connecting member, and a pressing portion provided in the recess and configured to press the component unit against the positioning portion.

According to the present disclosure, it is possible to prevent play caused by a gap between an electronic component and a recess for housing the electronic component.

DETAILED DESCRIPTION OF PREFERRED EMBODIMENTS

Figure 1:
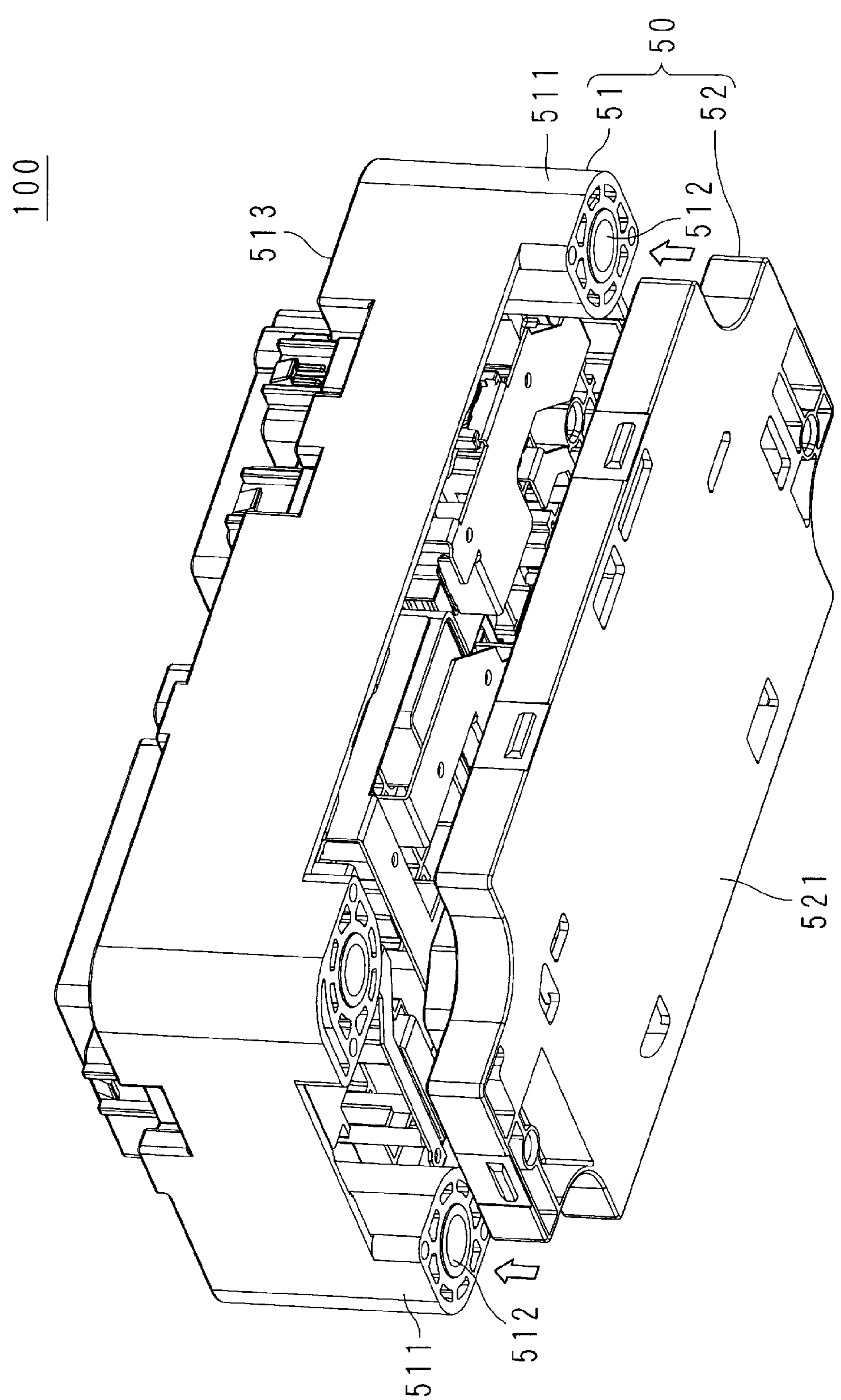
FIG. 1 is a partially exploded view of an electrical junction box according to the present embodiment.

First, embodiments of the present disclosure will be listed and described. Furthermore, at least some of the embodiments described below may be combined as appropriate.

An electrical junction box according to a first embodiment of the present disclosure is an electrical junction box provided with a component unit having an electronic component housed in a recess and a connecting member connecting a terminal of the electronic component to a contact outside of the recess, the electrical junction box including a positioning portion provided on a sidewall of the recess to protrude further than an edge of the sidewall, and configured to position the component unit by abutting against the connecting member, and a pressing portion provided in the recess and configured to press the component unit against the positioning portion.

In such an embodiment, when the component unit (electronic component) is housed in the recess for attachment to the electrical junction box, the pressing portion presses the component unit towards the positioning portion, and the component unit abuts against the positioning portion to position the component unit.

Therefore, the operation to attach the component unit is simplified to improve work efficiency. Furthermore, because the pressing portion continues to press the component unit after the positioning, play can be prevented.

In the electrical junction box according to a second embodiment of the present disclosure, the positioning portion straddles two sidewalls forming a corner.

In such an embodiment, the positioning portion straddles two sidewalls forming a corner. Therefore, it is possible to position the component unit at a plurality of points having different angles to improve the accuracy of positioning.

In the electrical junction box according to a third embodiment of the present disclosure, the pressing portion is a plurality of pressing portions including a first pressing portion provided on a sidewall opposing one of the two sidewalls and a second pressing portion provided on a sidewall opposing the other of the two sidewalls.

In such an embodiment, the first pressing portion and the second pressing portion are provided in locations of the recess that oppose the positioning portion. Therefore, because the component unit can be more reliably abutted against the positioning portion, the accuracy of positioning of the component unit can be improved.

In the electrical junction box according to a fourth embodiment of the present disclosure, each pressing portion includes an elastic plate that is further away from the sidewall as the elastic plate approaches a bottom of the recess.

In such an embodiment, because the elastic plate of each pressing portion is shaped to be further away from the sidewall as the elastic plate approaches the bottom of the recess, the pressing portion does not interfere when the component unit (electronic component) is housed in the recess.

In an electrical junction box according to a fifth embodiment of the present disclosure, the component unit is screw-fastened to the contact, and the electrical junction box includes a rotation prevention bar provided close to an outer surface of a sidewall of the recess and configured to prevent rotation of the component unit during the screw-fastening.

In such an embodiment, during screw-fastening of the component unit to the contact, the rotation prevention bar stops the corotation of the component unit. Therefore, the work efficiency of attaching the component unit can be improved.

An electrical junction box according to embodiments of the present disclosure will be described hereinafter with reference to the drawings. The present disclosure is not limited by these examples and is indicated by the claims, and all changes that come within the meaning and range of equivalency of the claims are intended to be encompassed therein.

The present embodiment will be described hereinafter using the example of an electrical junction box for a vehicle in which a fuse is mounted as an example of an electronic component.

FIG. 1 is a partially exploded view of an electrical junction box 100 according to the present embodiment. The electrical junction box 100 includes an enclosure 50 to which electronic components are attached.

The enclosure 50 is made, for example, of resin and includes a lower case 52 and an upper case 51 that covers the lower case 52. The enclosure 50 is attached to an object such that a bottom plate 521 of the lower case 52 faces the object. More specifically, the upper case 51 has closed-end cylindrical leg portions 511 provided at four corners thereof, and each leg portion 511 has a through-hole 512 formed in the bottom thereof. For example, the enclosure 50 (electrical junction box 100) can be attached to the object by inserting screws into the through-holes 512 of the leg portions 511 and screwing the screws into the object.

The upper case 51 has the shape of a flat enclosure having one face open, and ribs are formed at a plurality of locations in the upper case 51, and a plurality of mounts are also formed therein. Busbars, electronic components, and the like are attached to the above-described mounts.

Figure 2:
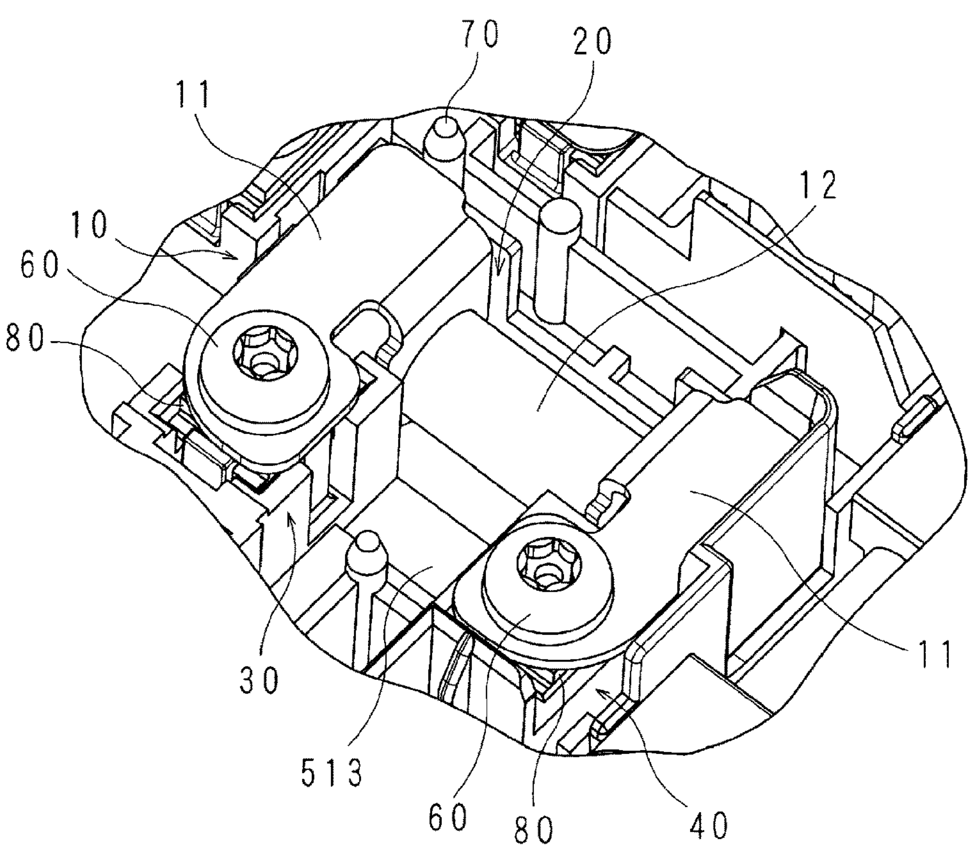
FIG. 2 is an exemplary view illustrating an upper case of the electronic junction box of the present embodiment with an electronic component attached thereto.

FIG. 2 is an exemplary view illustrating an upper case 51 of the electrical junction box 100 of the present embodiment with an electronic component attached thereto. FIG. 2 is a partial bottom view of the upper case 51, and shows a fuse unit 10 (component unit) attached thereto.

Formed in the inner surface (referred to as the bottom hereinafter) of a ceiling plate 513 of the upper case 51 is a recess 20 that houses a part of the fuse unit 10, with mounts 30 and 40 protruding adjacent to the recess 20 to fix the fuse unit 10. The fuse unit 10 prevents overcurrent flow.

Figure 3:
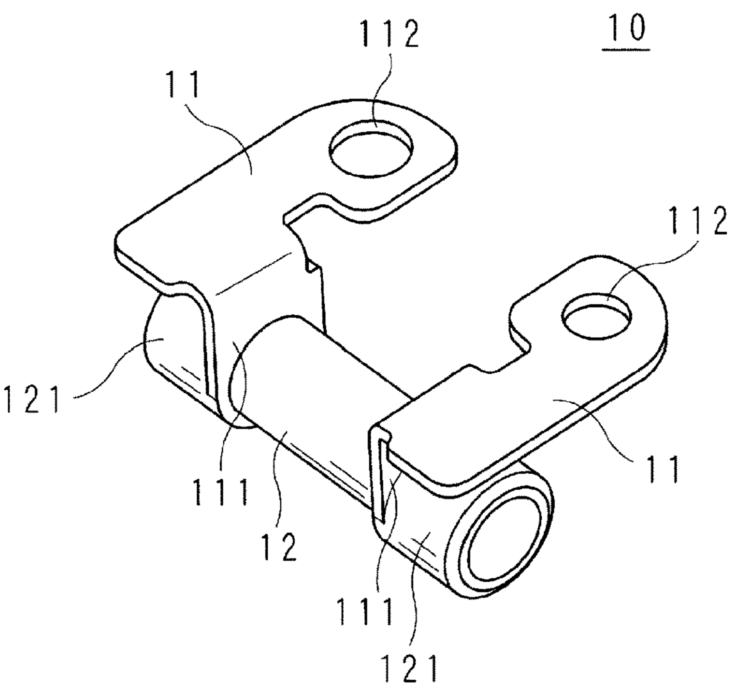
FIG. 3 is a perspective view showing a fuse unit.

FIG. 3 is a perspective view showing the fuse unit 10.

The fuse unit 10 includes a cylindrical fuse 12 (electronic component). The fuse 12 is made, for example, of glass or ceramic and has a fuse element (not shown) disposed therein. A cap 121 is attached on both end sides of the fuse 12. The cap 121 is made of a conductive metal having a closed-end cylindrical shape.

Additionally, the fuse unit 10 includes a pair of fixing legs 11 screw-fastened to the mounts 30 and 40. The paired fixing legs 11 are parallel to each other. Each fixing leg 11 is formed from a metal piece in an approximately rectangular shape with round corners. For example, the fixing legs 11 are made of the same material as the caps 121. Formed in one end of each fixing leg 11 is a through-hole 112 that passes through the fixing leg 11 in the thickness direction thereof.

Each fixing leg 11 is coupled to the respective cap 121 via a coupling plate 111. The coupling plate 111 is formed from a metal piece made of the same material as the fixing leg 11. One end of the coupling plate 111 is connected to a long side of the fixing leg 11 near the other end of the fixing leg 11 and extends in the thickness direction of the fixing leg 11. Also, the other end of the coupling plate 111 is coupled to an outer peripheral surface of the cap 121. In other words, the coupling plate 111 protrudes from the outer peripheral surface of the cap 121 in the radial direction of the cap 121. The coupling plates 111 oppose each other in the axial direction of the fuse 12.

For example, the fixing leg 11 and the coupling plate 111 may be integrally formed, or the fixing leg 11, the coupling plate 111, and the cap 121 may be integrally formed. The portion that includes the coupling plates 111, the caps 121, and the fuse 12 will be hereinafter referred to as the fuse 12 portion for convenience.

The fuse unit 10 can be screw-fastened to the mounts 30 and 40 (upper case 51) by inserting screws 60 into the through-holes 112 in the fixing legs 11 and screwing the screws 60 into the nuts 80 of the mount 30 and 40, respectively (see FIG. 2).

Figure 4:
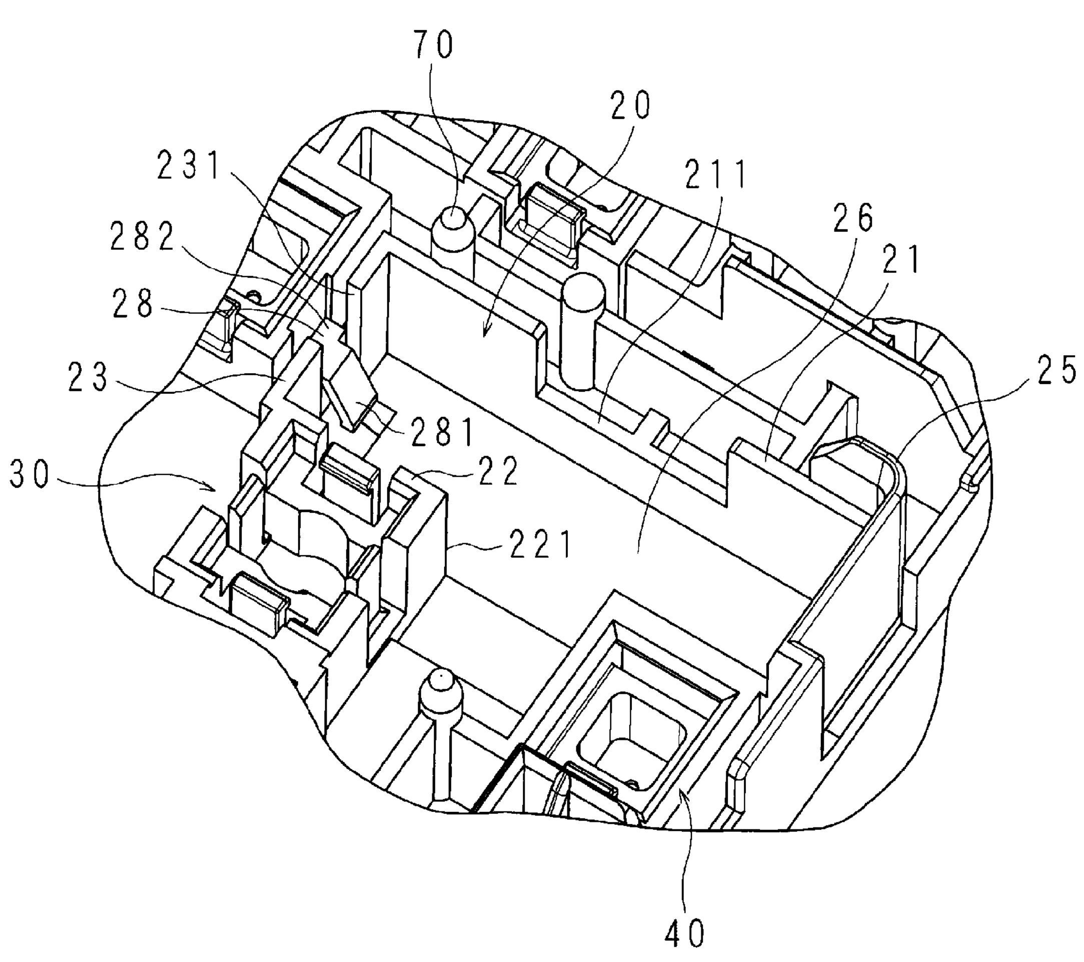
FIG. 4 is a partial perspective view showing an upper case with the fuse unit and screws removed.
Figure 5:
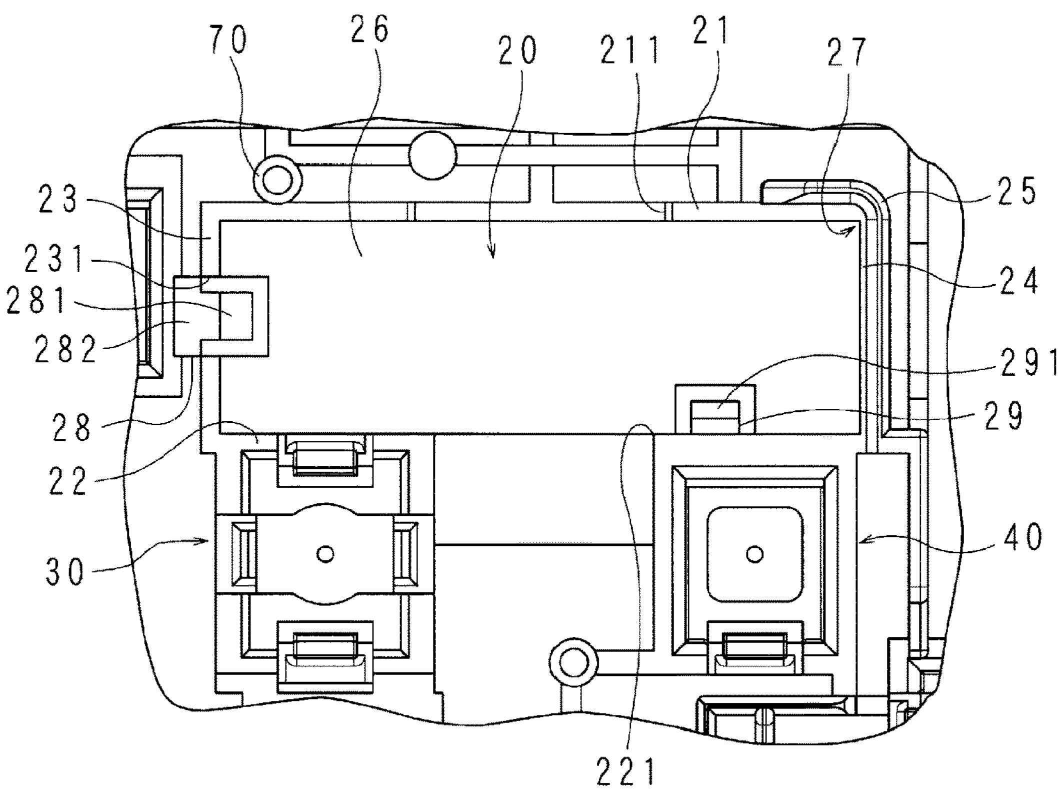
FIG. 5 is a partial bottom view showing the upper case with the fuse unit and the screws removed.

FIG. 4 is a partial perspective view of the upper case 51 showing the fuse unit 10 and the screws 60 removed, and FIG. 5 is a partial bottom view of the upper case 51 showing the fuse unit 10, the screws 60, and the nuts 80 removed. As mentioned above, a recess 20 is formed in the bottom of the upper case 51 in which the fuse 12 portion of the fuse unit 10 is housed.

The recess 20 has an approximately rectangular shape as seen from the bottom. The recess 20 is formed from long-side sidewalls 21 and 22 on both long sides and short-side sidewalls 23 and 24 on both short sides, and the long-side sidewalls 21 and 22 and the short-side sidewalls 23 and 24 stand erect on the bottom of the upper case 51. With the fuse unit 10 attached to the upper case 51, the fuse 12 portion of the fuse unit 10 is housed in the recess 20. The long-side sidewall 22 of the long-side sidewalls 21 and 22 is disposed adjacent to the mounts 30 and 40, and cutouts 211 and 221 are formed at the longitudinal centers of the long-side sidewalls 21 and 22, respectively.

A positioning portion 25 is provided on sidewalls of the recess 20. The positioning portion 25 positions the fuse unit 10 when the fuse unit 10 is attached to the upper case 51.

The positioning portion 25 is curved and provided at a corner 27 formed by the long-side sidewall 21 and the short-side sidewall 24. Specifically, the positioning portion 25 extends from the short-side sidewall 24 to the end portion of the long-side sidewall 21 on the short-side sidewall 24 side. Additionally, the positioning portion 25 protrudes, in the height direction of the long-side sidewall 21 and the short-side sidewall 24, further than the edges of the long-side sidewall 21 and the short-side sidewall 24. The positioning portion 25 may be integrally formed with the long-side sidewall 21 and the short-side sidewall 24.

The recess 20 includes a first spring portion 28 (first pressing portion) and a second spring portion 29 (second pressing portion) that press a part of the fuse unit 10 towards the positioning portion 25 when the fuse unit 10 is housed in the recess 20. The first spring portion 28 and the second spring portion 29 may also be abbreviated to spring portions 28 and 29 (pressing portions) hereinafter.

The spring portions 28 and 29 are provided inside the recess 20. The first spring portion 28 presses the fuse 12 portion of the fuse unit 10 towards the short-side sidewall 24, and the second spring portion 29 presses the fuse 12 portion of the fuse unit 10 towards the long-side sidewall 21.

The first spring portion 28 is made of resin and is provided on the short-side sidewall 23 opposing the short-side sidewall 24 on which the positioning portion 25 is provided. A cutout 231 is formed in the center of the short-side sidewall 23 to extend in the height direction of the short-side sidewall 23, and the first spring portion 28 is provided in the cutout 231.

The first spring portion 28 includes a support portion 282 having a rectangular plate shape and an elastic plate 281 provided on the surface of the support portion 282 that faces the recess 20, out of the two main surfaces thereof.

The support portion 282 is provided outside of the short-side sidewall 23 to cover the cutout 231, and extends along the short-side sidewall 23. The height of the support portion 282 is less than that of the short-side sidewall 23.

The elastic plate 281 protrudes inward of the recess 20 from the aforementioned surface of the support portion 282 via the cutout 231. The elastic plate 281 has a rectangular shape with one main surface thereof approximately opposing the aforementioned surface of the support portion 282. The elastic plate 281 obliquely intersects the aforementioned surface of the support portion 282. Specifically, the elastic plate 281 is provided to be further away from the short-side sidewall 23 (support portion 282) as the elastic plate 281 approaches the bottom of the recess 20. That is, the interval between the aforementioned surface of the support portion 282 and the elastic plate 281 becomes larger as the elastic plate 281 approaches the bottom of the recess 20. The elastic plate 281 has elasticity and is thus elastically deformable in directions in which the above-described interval increases and decreases.

The second spring portion 29 is made of resin and is provided on the long-side sidewall 22 opposing the long-side sidewall 21 on which the positioning portion 25 is provided. As shown in FIG. 5, the second spring portion 29 is provided on the end portion of the long-side sidewall 22 adjacent to the positioning portion 25 (short-side sidewall 24). That is, the second spring portion 29 is provided to approximately oppose the portion of the positioning portion 25 that is provided on the long-side sidewall 21.

The second spring portion 29 includes a block-shaped base portion protruding from the inner surface of the long-side sidewall 22 and an elastic plate 291 that is connected to the base portion and protrudes inward of the recess 20. Since the shape of the elastic plate 291 is similar to the elastic plate 281, detailed description thereof is omitted. The elastic plate 291 has elasticity and is thus elastically deformable in directions in which the above-described interval to the long-side sidewall 22 increases and decreases.

The spring portions 28 and 29 and the recess 20 may be integrally formed with the upper case 51.

A rotation prevention bar 70 protrudes on the outside of the long-side sidewall 21 of the recess 20. The rotation prevention bar 70 prevents the fuse unit 10 from rotating when the fuse unit 10 is attached to the upper case 51 (mounts 30, 40) by screw-fastening.

The rotation prevention bar 70 has the shape of a round bar with a reduced diameter at the distal end thereof. The rotation prevention bar 70 is provided near the end portion of the long-side sidewall 21 close to the short-side sidewall 23. The peripheral surface of the rotation prevention bar 70 is in contact with the outer surface of the long-side sidewall 21. The rotation prevention bar 70 has a greater height than the long-side sidewall 21. The rotation prevention bar 70 prevents rotation of the fuse unit 10 by coming into contact with a fixing leg 11 when the fuse unit 10 is attached (see FIG. 2). It should be noted that the rotation prevention bar 70 may be integrally formed with the long-side sidewall 21.

The following describes the operation to attach the fuse unit 10 to the upper case 51 in the electrical junction box 100 according to the present embodiment.

First, an operator picks up the fuse 12 of the fuse unit 10 and places the fuse 12 portion of the fuse unit 10 in the recess 20. As described above, because the electrical junction box 100 has the cutouts 211 and 221 formed at the centers of the long-side sidewalls 21 and 22, respectively, the long-side sidewalls 21 and 22 do not interfere with the operation of placing the fuse 12 portion in the recess 20. Moreover, at this time, the spring portions 28 and 29 are pressed by the fuse 12 portion and deform in directions that reduce the interval to the short-side sidewall 23 and the long-side sidewall 22, respectively.

Because the operator releases his or her hand upon the completion of the operation of placing the fuse 12 portion in the recess 20, the restoring force of the spring portions 28 and 29 acts on the fuse 12 portion. That is, the first spring portion 28 presses the fuse 12 portion in a direction that increases the interval to the short-side sidewall 23, that is, towards the positioning portion 25 on the short-side sidewall 24. Furthermore, the second spring portion 29 presses the fuse 12 portion in a direction that increases the interval to the long-side sidewall 22, that is, towards the positioning portion 25 on the long-side sidewall 21. The fuse unit 10 is thereby positioned.

Figure 6:
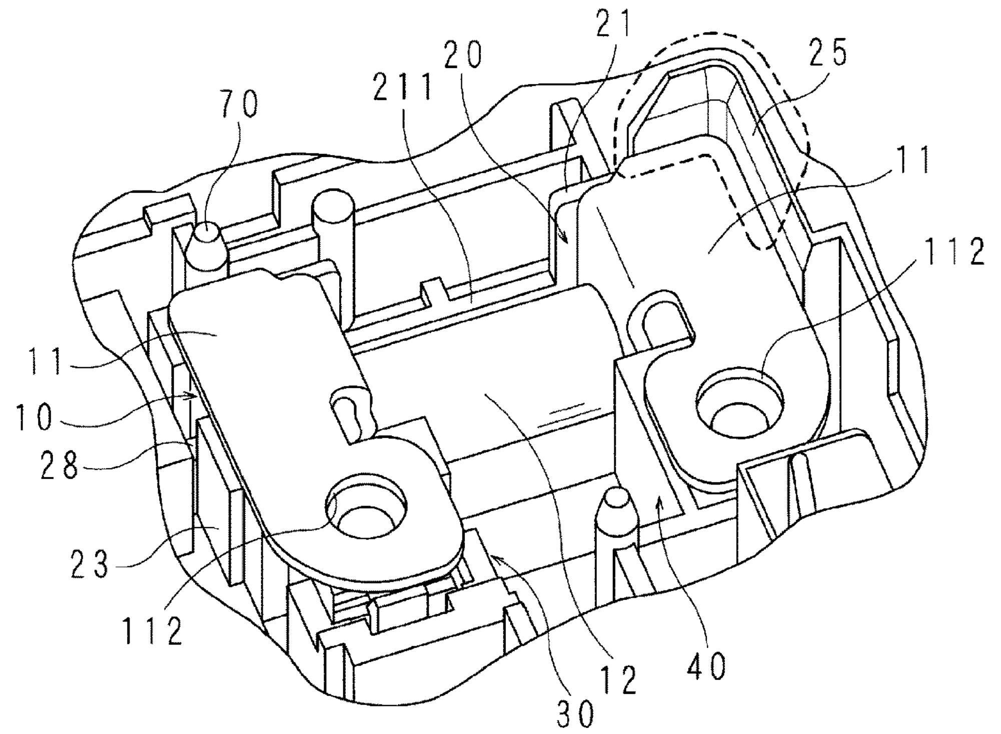
FIG. 6 is an explanatory diagram showing the positioned fuse unit at the time of attachment.

FIG. 6 is an explanatory diagram showing the positioned fuse unit 10 at the time of attachment. As described above, the fuse unit 10 is pressed by the spring portions 28 and 29 towards the positioning portion 25 to abut a long-side edge of a fixing leg 11 and the short-side edge on the other end of the fixing leg 11 against the positioning portion 25 of the short-side sidewall 24 and the positioning portion 25 of the long-side sidewall 21, respectively (see the dotted-line portion of FIG. 6). The fuse unit 10 is thereby easily positioned. It should be noted that after the positioning is performed in this way, the spring portions 28 and 29 continue to press the fuse unit 10 towards the positioning portion 25.

Subsequently, the operator screw-fastens the fuse unit 10 to the mounts 30 and 40 by inserting a screw 60 into each through-hole 112 of the fuse unit 10 and screwing the screws 60 in the nuts 80 of the mounts 30 and 40, respectively.

As described above, in the electrical junction box 100 according to the present embodiment, the operator has only to fit the fuse unit 10 in the recess 20, and positioning of the fuse unit 10 is performed by the spring portions 28 and 29. In this way, the work efficiency of attaching the fuse unit 10 can be improved.

Due to design errors or tolerances, however, a dimension of the recess 20 may be larger than an expected value or a dimension of the fuse unit 10 may be smaller than an expected value. If that happens, because the dimension of the recess 20 is larger than the dimension of the fuse 12 portion of the fuse unit 10, it can be assumed that a gap may exist between the recess 20 and the fuse 12 portion. In that case, noise may be generated due to play.

In contrast, in the electrical junction box 100 according to the present embodiment, as described above, the spring portions 28 and 29 continue to press the fuse unit 10 towards the positioning portion 25 even after the positioning. Accordingly, even if there is a gap between the recess 20 and the fuse 12 portion, it is possible to prevent generation of noise due to play.

Additionally, in the electrical junction box 100 according to the present embodiment, as described above, the positioning portion 25 is provided to straddle the short-side sidewall 24 and the long-side sidewall 21. That is, because the fuse unit 10 is positioned in two locations, the accuracy of the positioning can be improved.

Additionally, in the electrical junction box 100 according to the present embodiment, as described above, the spring portions 28 and 29 are disposed in locations opposing the positioning portion 25. As such, because the fuse unit 10 can be more reliably pressed against the positioning portion 25, the accuracy of positioning can be improved.

Furthermore, in the electrical junction box 100 according to the present embodiment, as described above, because the elastic plate 281 of the first spring portion 28 and the elastic plate 291 of the second spring portion 29 are shaped to be further distanced from their respective sidewalls as they approach the bottom of the recess 20, the spring portions 28 and 29 do not interfere when the operator is housing the fuse unit 10 in the recess 20.

The case where the positioning portion 25 is provided at the corner 27 of the recess 20 is described above as an example, but the positioning portion 25 is not limited to being provided at the corner 27, and may be provided at any of the other corners. The first spring portion 28 and the second spring portion 29 need only be provided on two sidewalls that form a diagonal opposite corner to the corner at which the positioning portion 25 is provided.

Furthermore, while the case where the rotation prevention bar 70 is provided on the outside of a long-side sidewall 21 of the recess 20 is described as an example, the present disclosure is not limited thereto. The rotation prevention bar 70 may be provided on the outside of the short-side sidewall 23 and 24.

It should be noted that the spring portions 28 and 29 are not limited to the foregoing description, and may be formed of springs, rubber, or the like.

The embodiments disclosed herein should be considered to be illustrative in all respects and not restrictive. The scope of the present disclosure is indicated by the claims rather than by the above meaning, and all changes that come within the meaning and range of equivalency of the claims are intended to be encompassed therein.

The invention claimed is:

1. An electrical junction box configured to house a component unit having an electronic component and a connecting member having a terminal, the electrical junction box comprising:

a first long-side sidewall spaced apart from a second long-side sidewall, a first short-side sidewall spaced apart from a second short-side sidewall, the first long-side sidewall, the second long-side sidewall, the first short-side sidewall and the second short-side sidewall coupled together to define a recess configured to receive the component unit wherein the terminal is configured to attach to a contact outside of the recess, wherein the first long-side sidewall and the first short-side sidewall are orthogonal to each other to define a corner;

a positioning portion extending along a portion of the first long-side sidewall and the first short-side sidewall at the corner, the positioning portion protruding further than an edge of the first long-side sidewall and the first short-side sidewall; and a pressing portion provided in the recess and configured to press the component unit against the positioning portion.

2. The electrical junction box according to claim 1, wherein the pressing portion is a plurality of pressing portions, and the plurality of pressing portions includes a first pressing portion provided on the second short-side sidewall and a second pressing portion provided on the second long-side sidewall.

3. The electrical junction box according to claim 2, wherein each pressing portion includes an elastic plate that is further away from the corresponding one of the second short-side sidewall and the second long-side sidewall as the elastic plate approaches a bottom of the recess.

4. The electrical junction box according to claim 1, wherein the component unit is screw-fastened to the contact, and the electrical junction box includes a rotation prevention bar provided close to an outer surface of the first long-side sidewall of the recess and configured to prevent rotation of the component unit during the screw-fastening.

5. The electrical junction box according to claim 1, wherein the component unit is screw-fastened to the contact, and the electrical junction box includes a rotation prevention bar provided close to an outer surface of the first long-side sidewall of the recess and configured to prevent rotation of the component unit during the screw-fastening.

6. The electrical junction box according to claim 2, wherein the component unit is screw-fastened to the contact, and the electrical junction box includes a rotation prevention bar provided close to an outer surface of the first long-side sidewall of the recess and configured to prevent rotation of the component unit during the screw-fastening.

7. The electrical junction box according to claim 3, wherein the component unit is screw-fastened to the contact, and the electrical junction box includes a rotation prevention bar provided close to an outer surface of the first long-side sidewall of the recess and configured to prevent rotation of the component unit during the screw-fastening.

* * * * *